United States Patent [19]

Maayeh

[11] Patent Number: 5,362,792
[45] Date of Patent: Nov. 8, 1994

[54] GIVE STICK FOR HIGH-TEMPERATURE AND LOW-TEMPERATURE APPLICATION BASED ON ETHYLENE VINYL ACETATE AND TACKIFYING RESINS

[75] Inventor: Elias S. Maayeh, Arlington, Tex.

[73] Assignee: Uniplast, Inc., Arlington, Tex.

[21] Appl. No.: 70,046

[22] Filed: Jun. 1, 1993

Related U.S. Application Data

[63] Continuation of Ser. No. 821,089, Jan. 16, 1992, abandoned.

[51] Int. Cl.$^5$ .................... C08J 5/10; C08K 5/01; C08L 31/04
[52] U.S. Cl. .................... 524/491; 524/62; 524/69; 524/71; 524/77; 524/187; 524/270; 524/272; 524/274; 524/488; 524/489; 524/490; 524/502; 524/563
[58] Field of Search .................... 524/62, 69, 71, 77, 524/187, 270, 488, 489, 502, 563, 272, 274, 490, 491

[56] References Cited

U.S. PATENT DOCUMENTS

| | | | |
|---|---|---|---|
| 4,361,672 | 11/1982 | Agarwal et al. | 525/54.5 |
| 4,456,649 | 6/1984 | Clarke | 524/488 |
| 4,497,941 | 2/1985 | Aliani et al. | 526/331 |
| 4,738,998 | 4/1988 | Uffner et al. | 524/69 |
| 4,908,408 | 3/1990 | Boutillier et al. | 525/124 |
| 5,041,482 | 8/1991 | Ornsteen et al. | 524/272 |

Primary Examiner—Paul R. Michl
Assistant Examiner—U. K. Rajguru
Attorney, Agent, or Firm—Ross, Howison, Clapp & Korn, L.L.P.

[57] ABSTRACT

An adhesive composition is comprised of a mixture of an EVA copolymer and two tackifying resins, a high temperature tackifying resin and a low temperature tackifying resin. The viscosity of the adhesive composition is between 2,000 cps to 80,000 cps over a temperature range of 250° F. to 380° F. The composition comprises 60% by weight of the copolymer, 15% by weight of the low temperature tackifying resin and 25% by weight of the high temperature tackifying resin.

34 Claims, 1 Drawing Sheet

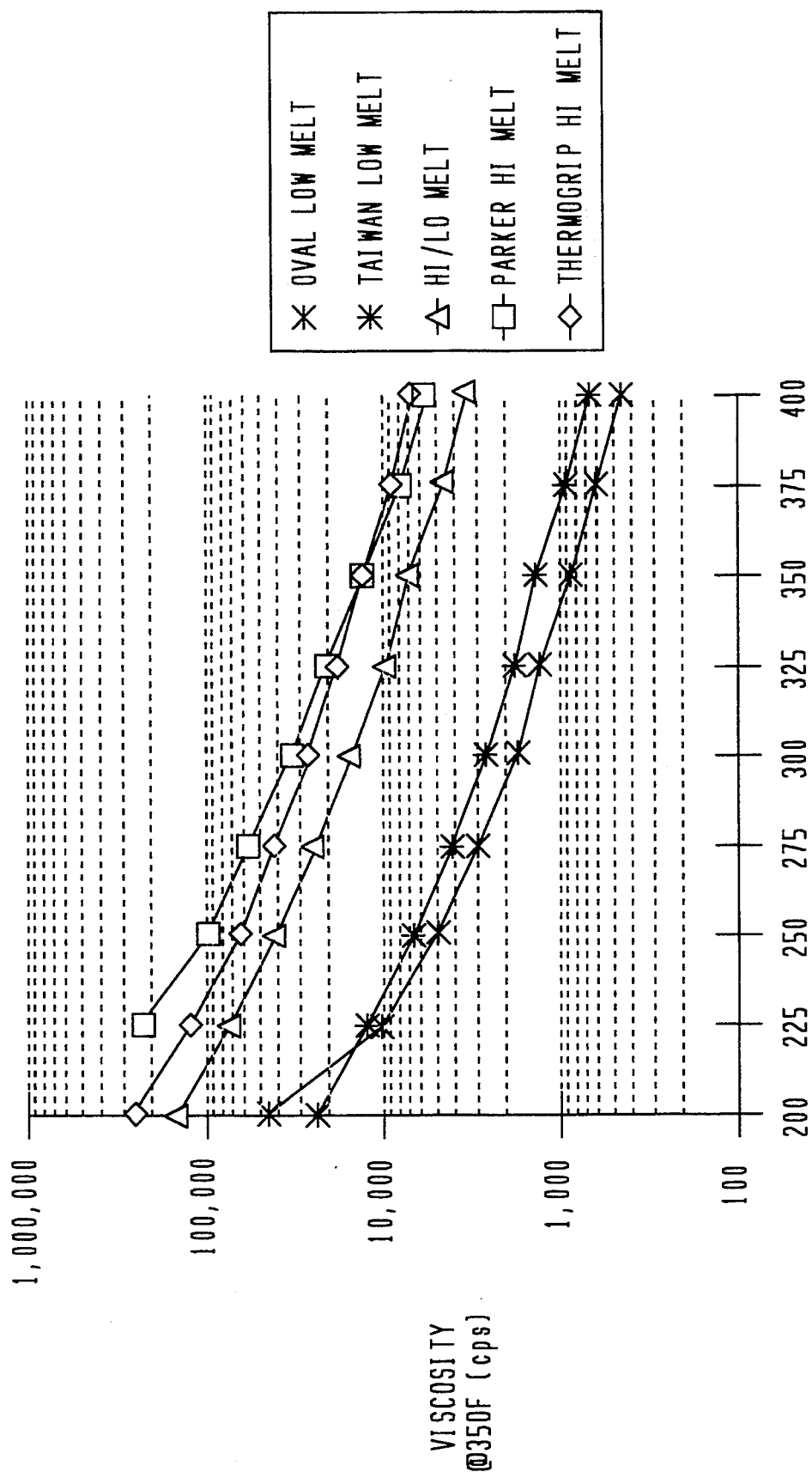

GIVE STICK FOR HIGH-TEMPERATURE AND LOW-TEMPERATURE APPLICATION BASED ON ETHYLENE VINYL ACETATE AND TACKIFYING RESINS

This application is a continuation of application Ser. No. 07/821,089, filed Jan. 16, 1992 now abandoned.

TECHNICAL FIELD OF THE INVENTION

The present invention pertains in general to adhesives, especially hotmelt adhesives for use in commercial glue gun applications at multiple application temperatures.

BACKGROUND OF THE INVENTION

Currently available adhesive systems are typically based on polymeric materials that can be divided into one of two classes, thermoset or thermoplastics. Although the thermoset class inherently has better cohesive strength, is thermally stable, and in general, can be formulated to adhere to a wide variety of substrates, the thermoplastic adhesives or hot-melt adhesives are preferred. These adhesives develop their bond strength almost instantaneously, requiring virtually no time for cure and can be applied and reactivated relatively easily under severe environmental conditions. The hot-melt adhesives have found wide applications in the commercial market to provide bonding of a wide variety of materials.

The first commercially available hot-melt adhesives were packaged as glue sticks that were utilized in conjunction with a glue gun to apply the glue at temperatures of around 380° F. The viscosities of these early glue sticks upon application was around 9000 cps; they had a rather sharp viscosity curve and were not very useful at lower temperatures. Applications of a glue to material that was heat sensitive below 380° F. essentially precluded the use of these hotmelt adhesives. As a result, low temperature hot-melt adhesives were developed. Examples of these are described in U.S. Pat. No. 5,041,482 and U.S. Pat. No. 4,986,680. These low temperature hot-melt compositions required a special glue gun that operated at a temperature of around 250° F. The viscosity exhibited by these low temperature hot-melt compositions was around 4900 at 250° F. However, their viscosity at 380° C. was less than 600 cps. As a result, if these glue sticks were utilized in a glue gun that had application temperatures of 380° F., i.e., a high temperature glue gun, they would exhibit a very "runny" composition and would provide little utility. However, if the opposite occurred wherein a high temperature hot-melt adhesive composition were utilized in a stick form with the low temperature glue gun, the viscosity of these materials would be in excess of 100,000, and, as such, they would not freely flow and would result in jamming of the glue guns. As a result of this, glue guns were developed having two application temperatures. One solution to multiple glue sticks is to design one of the guns to utilize a different shape for the glue stick.

One disadvantage to having both high temperature and low temperature glue sticks is that a commercial establishment must now not only carry glue guns that are capable of multiple application temperatures, but also, the establishments must stock two types of glue sticks. This creates problems from both an inventory standpoint for the retailer and the use by the purchaser.

SUMMARY OF THE INVENTION

According to the present invention, a single glue stick is provided that is adapted for use over a temperature range for which separate high and low melt temperature glue sticks were previously required. According to a preferred embodiment of the invention, the subject glue sticks are made of an adhesive composition that comprises a mixture of an EVA copolymer and two tackifying resins. One of the tackifying resins is preferably a high temperature tackifying resin; the other is preferably a low temperature tackifying resin. The adhesive composition of the invention preferably exhibits a viscosity between about 80,000 cps and about 2,000 cps over a temperature range of about 250° F. to about 380° F.

According to a particularly preferred embodiment of the invention, the adhesive composition used in making the glue sticks comprises about 60% by weight of the copolymer, about 15% by weight of the low temperature tackifying resin and about 25% by weight of the high temperature tackifying resin.

BRIEF DESCRIPTION OF THE DRAWINGS

For a more complete understanding of the present invention and the advantages thereof, reference is now made to the following description taken in conjunction with the accompanying Drawing in which FIG. 1 illustrates a logarithmic plot of the values in Table 4.

DETAILED DESCRIPTION OF THE INVENTION

The basic polymer of the adhesive composition of the invention is preferably selected from the copolymers of olefins and esters. A particularly preferred copolymer for use as the basic polymer of the adhesive composition is an ethylene vinyl acetate copolymer, which is manufactured by Exxon Chemicals under the trade name Escorene® UL 7510 (EDA). The properties of the EVA copolymer utilized in the present invention are listed in Table 1.

TABLE 1

| | |
|---|---|
| Vinyl Acetate Content (wt %) | 18 |
| Melt Index (dg/min) | 450 |
| Melt Viscosity (cps @ 250° F.) | 350 |
| Specific Gravity, 20/20 °C. | 0.920 |
| Softening Point, R&B, °C. | 85 |
| Bulk Density, lbs/ft | 33 |
| Melt Temperature (Tm), °C. | 78 |
| Crystallization Temperature (Tc), °C. | 52 |
| Tensile Strength, psi | 600 |
| Elongation, % | 650 |
| Hardness, Durometer | 80 |
| Refractive Index | 1,487 |
| Cloud Point, °C. | 70 |

The EVA copolymer is desirably combined with two different tackifying resins, a low temperature tackifying resin and a high temperature tackifying resin. The low temperature tackifying resin is preferably a hydrocarbon tackifying resin, which is an aromatic modified aliphatic resin that is soluble in both aromatic and aliphatic solvents. One satisfactory low temperature tackifying resin for use in the invention is manufactured by Exxon Chemicals under the produce name ECR165. A summary of the properties of the low temperature tackifying resin is provided in Table 2.

TABLE 2

| | |
|---|---|
| Softening Point, °C. | 105 |
| Color | |
| Initial, Saybolt | >27 |
| Aged, 5 hrs @ 177 °C. | |
| Gardner | <2 |
| GPC, Molecular Weight | |
| Mw | 455 |
| Mn | 216 |
| Mw/Mn | 2.11 |
| Mz | 960 |
| Melt Viscosity, cps | |
| 140 °C. | 6250 |
| 160 °C. | 990 |
| 180 °C. | 260 |
| Glass Transition via DSC, °C. | 55 |
| Volatility, wt. % | .67 |

The high temperature tackifying resin is also preferably a petroleum hydrocarbon resin. A satisfactory resin for use as the high temperature tackifying resin is manufactured by Exxon Chemicals under the product name Escorez ® 5320. A summary of the properties for the high temperature tackifying resin is provided in Table 3.

TABLE 3

| | |
|---|---|
| Softening Point, R&B, °C. | 125 |
| Color | |
| Saybolt Color, Initial | 30 |
| Gardner, Color, | 5 |
| After 16 Hours @ 350 °F. | |
| Molten Gardner Color | 1 |
| Cloud Point, °C., 20/40/40 | 70 |
| Melt Viscosity, cps | |
| 300 °F. | 22,000 |
| 350 °F. | 1,500 |
| 400 °F. | 250 |
| Molecular Weight | |
| Mw | 460 |
| Mn | 360 |
| Mw/Mn | 1.3 |
| Tg, °C. | 70 |
| Volatility, wt. % | 1.5 |

The low temperature tackifying resin preferably comprises approximately 15% by weight of the adhesive composition. The high temperature tackifying resin, which aids in providing adequate viscosity over the higher end of the temperature range, preferably comprises from about 20% to about 30%, and most preferably about 25%, by weight of the adhesive composition. It can be seen from the tables that the softening point for the high temperature tackifying resin is about 125° C. whereas the softening point for the low temperature tackifying resin is about 105° C. The EVA copolymer has a melting point of about 78° C. and a softening point of about 85° C.

When the base copolymer and the low and high temperature tackifying resins are combined in the proportions disclosed herein, they provide a viscosity range that is acceptable at both the low end (about 250° F.) and at the high end (about 380° F.) of the temperature range. A comparison of the Hi/Lo composition of the present invention and two low-melt compositions, Low-Melt A and Low-Melt B, and two hi-melt compositions, Hi-melt A and Hi-melt B is illustrated in Table 4.

TABLE 4

| | VISCOSITY (cps) | | | | |
|---|---|---|---|---|---|
| Temp. | Low Melt A | Low Melt B | Hi/Lo Melt | Melt A | Melt B |
| 200 °F. | 44,800 | 23,750 | 137,500 | >500,000 | 219,500 |
| 225 °F. | 10,613 | 11,625 | 70,900 | 210,500 | 118,750 |
| 250 °F. | 4,900 | 6,700 | 39,500 | 102,750 | 68,750 |
| 275 °F. | 2,965 | 4,075 | 23,500 | 56,500 | 42,300 |
| 300 °F. | 1,830 | 2,605 | 15,000 | 32,000 | 26,700 |
| 325 °F. | 1,245 | 1,755 | 9,775 | 19,500 | 18,000 |
| 350 °F. | 848 | 1,300 | 6,725 | 12,425 | 12,375 |
| 375 °F. | 620 | 900 | 4,800 | 8,350 | 9,000 |
| 400 °F. | 450 | 680 | 3,525 | 5,763 | 6,450 |

It can be seen from Table 4 that the viscosity of the adhesive composition of the present invention is around 39,500 cps at 250° F. and 4,800 cps at 375° F. By comparison, the two low-melt compositions have a viscosity of less than 1,000 cps, both at the temperature of 375° F., with acceptable viscosities of between 4,500–7,000 cps at 250° F. By comparison, the hi-melt compositions have a viscosity of between 8,000–9,000 cps at 375° F., but greater than 60,000 at 250° F. As such, the hi-melt compositions A and B would not flow through a glue gun at the low temperatures, whereas the low-melt compositions A and B would be runny and incompatible with any applications at the high temperature. Typically, the viscosity at the high temperature of 380° F. should be greater than 2,000 and at the low temperature of 250° F. should be less than 80,000 cps.

Referring now to FIG. 1, there is illustrated a logarithmic plot of the values in Table 4. It can be seen that all the hi-melt compositions are grouped together and all the low-melt compositions are grouped together. The composition of the present invention is disposed between the two, but in such a manner that the viscosity between 250° F. and 380° F. is between 80,000 cps and 2,000 cps.

In summary, a hot-melt adhesive composition is provided herein that, when manufactured into a glue stick and used in a glue gun, will form a melt exhibiting a viscosity between about 80,000 and about 2,000 cps, and most preferably between about 40,000 and about 5,000 cps when applied at temperatures ranging between about 250° F. and about 380° F. The adhesive composition preferably comprises an EVA copolymer combined with a tackifying resin having no wax component. The tackifying resin preferably comprises a low temperature tackifying resin in combination with a high temperature tackifying resin. The adhesive compositions disclosed herein are manufactured into glue sticks having a desired length and crosssectional shape by conventional means such glue ticks can be made such that the major portion of the stick is the mixture of an EVA copolymer, a high-temperature tackifying resin and a low-temperature tackifying resin exhibiting a viscosity between about 80,000 cps and about 2,000 cps over a temperature range of about 250° F. to about 380° F.

Although the preferred embodiment has been described in detail, it should be understood that various changes, substitutions and alterations can be made therein without departing from the spirit and scope of the invention as defined by the appended claims.

What is claimed is:

1. A glue stick composition for use with glue guns comprising a mixture of (a) an EVA copolymer, (b) a high temperature tackifying resin and (c) a low temperature tackifying resin, the admixture being formable into a stick for use in a glue gun and exhibiting a viscosity between about 80,000 cps and about 2,000 cps over a temperature range of about 250° F. to about 380° F.

2. The composition of claim 1 comprising a mixture of about 15 weight percent of the low temperature tackifying resin, from about 20 to about 30 weight percent of the high temperature tackifying resin, and a major portion of the EVA copolymer.

3. The composition of claim 2 comprising about 25 weight percent of the high temperature tackifying resin.

4. The composition of claim 1 wherein the low temperature tackifying resin is a petroleum hydrocarbon resin having a softening point of about 125° C.

5. The composition of claim 1 wherein the high temperature tackifying resin is a petroleum hydrocarbon resin having a softening point of about 125° C.

6. The composition of claim 1 comprising about 60 weight percent of the EVA copolymer.

7. The composition of claim 6 wherein the EVA copolymer has a vinyl acetate content of about 18 weight percent.

8. The composition of claim 6 wherein the EVA copolymer has a melt index of about 450 dg/min.

9. The composition of claim 6 wherein the EVA copolymer has a softening point of about 85° C.

10. The composition of claim 6 wherein the EVA copolymer has a melt temperature of about 78° C.

11. The composition of claim 1, exhibiting a viscosity between about 40,000 cps and about 5,000 cps over a temperature range of about 250° F. to about 380° F.

12. A glue stick comprising a major portion of an adhesive composition further comprising a mixture of an EVA copolymer, a high temperature tackifying resin and a low temperature tackifying resin, the composition exhibiting a viscosity between about 80,000 cps and about 2,000 cps over a temperature range of about 250° F. to about 380° F.

13. The glue stick of claim 12 wherein the adhesive composition comprises a mixture of about 15 weight percent of the low temperature tackifying resin, from about 20 to about 30 weight percent of the high temperature tackifying resin, and a major portion of the EVA copolymer.

14. The glue stick of claim 13 wherein the adhesive composition comprises about 25 weight percent of the high temperature tackifying resin.

15. The glue stick of claim 12 wherein the low temperature tackifying resin is a petroleum hydrocarbon resin having a softening point of about 105° C.

16. The glue stick of claim 12 wherein the high temperature tackifying resin is a petroleum hydrocarbon resin having a softening point of about 125° C.

17. The glue stick of claim 12 wherein the adhesive composition comprises about 60 weight percent of the EVA copolymer.

18. The glue stick of claim 17 wherein the EVA copolymer has a vinyl acetate content of about 18 weight percent.

19. The glue stick of claim 17 wherein the EVA copolymer has a melt index of about 450 dg/min.

20. The glue stick of claim 17 wherein the EVA copolymer has a softening point of about 85° C.

21. The glue stick of claim 17 wherein the EVA copolymer has a melt temperature of about 78° C.

22. The glue stick of claim 12, wherein the adhesive composition exhibits a viscosity between about 40,000 cps and about 5,000 cps over a temperature range of about 250° F. to about 380° F.

23. A glue gun glue stick having a viscosity profile that will allow an application temperature as low as about 250° F. and as high as about 380° F.

24. The glue gun glue stick of claim 23 consisting essentially of the combination of an EVA copolymer, a high temperature tackifying resin and a low temperature tackifying resin.

25. The glue gun glue stick of claim 23 having a viscosity profile that will allow an application temperature range of from about 250° F. to about 380° F.

26. The glue gun glue stick of claim 25 wherein the glue stick exhibits a viscosity profile between about 80,000 cps and about 2,000 cps over the temperature range.

27. The glue gun glue stick of claim 24 wherein the glue stick consists essentially of a mixture of about 15 weight percent of the low temperature tackifying resin, from about 20 to about 30 weight percent of the high temperature tackifying resin, and a major portion of the EVA copolymer.

28. The glue gun glue stick of claim 24 wherein the low temperature tackifying resin is a petroleum hydrocarbon resin having a softening point of about 105° C.

29. The glue gun glue stick of claim 24 wherein the high temperature tackifying resin is a petroleum hydrocarbon resin having a softening point of about 125° C.

30. The glue gun glue stick of claim 24 wherein the glue stick comprises about 60 weight percent of the EVA copolymer.

31. The glue gun glue stick of claim 24 wherein the EVA copolymer has a softening point of about 85° C.

32. The glue gun glue stick of claim 24 wherein the glue stick exhibits a viscosity profile between about 40,000 cps and about 5,000 cps over a temperature range of about 250° F. to about 380° F.

33. A glue stick comprising an admixture of
(a) about 55% to about 65% of an ethylene vinyl acetate copolymer;
(b) from about 20% to about 30% of a petroleum tackifying resin;
(c) from about 10% to about 20% of a hydrocarbon tackifying resin which is an aromatic modified aliphatic resin that is soluble in both aromatic and aliphatic solvents; and
(d) said admixture being formable into sticks for use in a glue gun having a viscosity of over 100,000 cps at 200° F. and exhibiting a viscosity in the range of from about 80,000 cps to about 2,000 cps over a temperature range of about 250° F. to about 380°.

34. A glue tick consisting essentially of an admixture of
(a) about 55% to about 65% of an ethylene vinyl acetate copolymer;
(b) from about 20% to about 30% of a petroleum tackifying resin;
(c) from about 10% to about 20% of a hydrocarbon tackifying resin which is an aromatic modified aliphatic resin that is soluble in both aromatic and aliphatic solvents; and
(d) said admixture being formable into sticks for use in a glue gun having a viscosity of over 100,000 cps at 200° F. and exhibiting a viscosity in the range of from about 80,000 cps to about 2,000 cps over a temperature range of about 250° F. to about 380°.

* * * * *

UNITED STATES PATENT AND TRADEMARK OFFICE
CERTIFICATE OF CORRECTION

PATENT NO. : 5,362,792

DATED : November 8, 1994

INVENTOR(S) : Elias S. Maayeh

It is certified that error appears in the above-identified patent and that said Letters Patent is hereby corrected as shown below:

Column 3, line 54, insert --,-- after "C.".

Column 4, line 53, replace "crosssectional" with --cross-sectional--.

Column 6, claim 34, line 52, replace "tick" with --stick--.

Signed and Sealed this

Twenty-eight Day of February, 1995

Attest:

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO. : 5,362,792

DATED : November 8, 1994

INVENTOR(S) : Elias S. Maayeh

It is certified that error appears in the above-indentified patent and that said Letters Patent is hereby corrected as shown below:

Column 6, Claim 32, line 34, replace "24" with --25--.

Signed and Sealed this

Eleventh Day of March, 1997

Attest:

BRUCE LEHMAN

Attesting Officer      Commissioner of Patents and Trademarks